US009325250B2

(12) United States Patent
Salerno et al.

(10) Patent No.: US 9,325,250 B2
(45) Date of Patent: Apr. 26, 2016

(54) METHOD AND SYSTEM FOR POLARITY INDEPENDENT STEP-UP CONVERTER CAPABLE OF OPERATING UNDER ULTRA-LOW INPUT VOLTAGE CONDITION

(75) Inventors: David Charles Salerno, New Boston, NH (US); John Phillip Bazinet, Concord, NH (US)

(73) Assignee: Linear Technology Corporation, Milpitas, CA (US)

( * ) Notice: Subject to any disclaimer, the term of this patent is extended or adjusted under 35 U.S.C. 154(b) by 1291 days.

(21) Appl. No.: 12/686,749

(22) Filed: Jan. 13, 2010

(65) Prior Publication Data

US 2010/0195360 A1 Aug. 5, 2010

Related U.S. Application Data

(60) Provisional application No. 61/144,216, filed on Jan. 13, 2009, provisional application No. 61/256,628, filed on Oct. 30, 2009.

(51) Int. Cl.
*H02M 3/338* (2006.01)
*H02M 1/10* (2006.01)

(52) U.S. Cl.
CPC .............. *H02M 3/3381* (2013.01); *H02M 1/10* (2013.01); *F23N 2037/10* (2013.01)

(58) Field of Classification Search
CPC ........... Y02B 70/1433; Y02B 70/1475; Y02B 20/185; Y02B 70/126; H02M 3/33561; H02M 3/33576; H02M 3/33569; H02M 3/338; H02M 2038/026
USPC .............. 363/131–132, 18, 22, 123, 125–127
See application file for complete search history.

(56) References Cited

U.S. PATENT DOCUMENTS

| 2,214,864 | A | * | 9/1940 | Stonehill | ................. | H01F 29/06 |
| | | | | | | 336/138 |
| 4,559,590 | A | * | 12/1985 | Davidson | ................... | 363/21.02 |
| 4,890,210 | A | | 12/1989 | Myers | | |
| 5,331,258 | A | * | 7/1994 | Lankin et al. | ................. | 318/139 |
| 6,082,115 | A | * | 7/2000 | Strnad | ..................... | F25B 21/04 |
| | | | | | | 232/907 |
| 6,177,829 | B1 | * | 1/2001 | Jones et al. | .................... | 327/536 |
| 6,340,787 | B1 | * | 1/2002 | Simeray | ................. | G04C 10/00 |
| | | | | | | 136/201 |

(Continued)

FOREIGN PATENT DOCUMENTS

TW 200836467 A 9/2008

OTHER PUBLICATIONS

European Search Report issued in European Patent Application No. 10150693.9 dated Feb. 10, 2012.

(Continued)

*Primary Examiner* — Adolf Berhane
*Assistant Examiner* — Henry Lee, III

(57) ABSTRACT

Apparatus and method for a polarity independent step-up converter capable of operating with ultra low input voltage. The step-up converter as disclosed herein receives an input source having a variable polarity and includes a first core circuit coupled to the input source and an output of the step-up converter and a second core circuit coupled to the input source and the output of the step-up converter. The first core circuit is configured to be active for a first input voltage polarity to output a first step-up voltage and the second core circuit is configured to be active for a second input voltage polarity to output a second step-up voltage.

32 Claims, 14 Drawing Sheets

(56) References Cited

U.S. PATENT DOCUMENTS

| | | |
|---|---|---|
| 6,678,175 B1 * | 1/2004 | Ferencz et al. ............. 363/56.01 |
| 6,747,880 B2 * | 6/2004 | Grover ....................... 363/21.06 |
| 8,231,240 B1 * | 7/2012 | Rubio ..................... E01F 9/065 |
| | | 136/203 |
| 2004/0176859 A1 | 9/2004 | Chian et al. |
| 2006/0077696 A1 * | 4/2006 | Summer .................... 363/21.12 |
| 2006/0113971 A1 * | 6/2006 | Watanabe et al. ............. 323/265 |

OTHER PUBLICATIONS

Douseki et al: "A Batteryless Wireless System Uses Ambient Heat with a Reversible-power-source Compatible CMSO/SOI DC-DC Converter", Solid State Circuits Conference, 2003. Digest of Technical Papers. ISS CC. 2003 IEEE International San Francisco, CA. Feb. 9-13, 2003.

Search Report dated Feb. 18, 2014 for Taiwanese Patent Application No. 099100848.

* cited by examiner

METHOD AND SYSTEM FOR POLARITY INDEPENDENT STEP-UP CONVERTER CAPABLE OF OPERATING UNDER ULTRA-LOW INPUT VOLTAGE CONDITION

RELATED APPLICATION

The present invention claims priority over U.S. Provisional Patent Application No. 61/144,216 filed Jan. 13, 2009, and U.S. Provisional Application No. 61/256,628 filed Oct. 30, 2009, the contents of which are incorporated herein in their entirety.

BACKGROUND

1. Technical Field

The present teaching relates to method and system for analog circuits. More specifically, the present teaching relates to method and system for step-up converters and systems incorporating the same.

2. Discussion of Technical Background

Step-up DC/DC converters are frequently used to boost a DC input voltage to a higher voltage. A common example is to boost a voltage from a single 1.5 VDC alkaline cell up to a regulated 3.3 VDC to power, e.g., analog or digital circuitry in a portable device. Conventionally, step-up converters can operate from input voltages as low as 1V, allowing them to be powered from a single cell. However, there are applications that must operate from an input voltage significantly less than 0.5V. Examples include applications where battery power is not practical, either due to an inhospitable environment or a remote location where having periodical access to replace batteries is impractical. In those situations, although alternate forms of energy may be an option to power the electronics, such as photovoltaic (PV) cells, thermopiles, and Peltier cells (also called thermo-electric coolers), these alternative energy sources produce an output voltage well below 1V, and in some cases just a few hundred millivolts or less.

Such low input voltages pose a problem for conventional DC/DC converters because they can not start or operate at an input voltage of a few hundred millivolts or less. One reason for that is that such a low input voltage is simply not high enough to forward bias the emitter-base junction of a transistor, or satisfy the threshold voltage of a typical MOSFET, making it impossible to power the converter.

Although a higher voltage may be achieved by putting multiple devices in series, such a solution increases size and cost. Another solution, which is well documented, is to use a depletion-mode transistor, such as a depletion-mode, N-channel JFET, and a step-up transformer with a high primary to secondary turns ratio. Since a depletion-mode device conducts current with no bias voltage applied to its gate, a free-running oscillator can be constructed, using the transformer to provide enough gain to oscillate and step-up the input voltage. Such designs can operate from an input voltage of 50 mV or less, generating an output voltage of several volts or more when a proper transformer turns ratio is provided.

FIG. 1(a) shows such a simplified implementation with a turns ratio of 1:100. In this prior art solution, the transformer T1 is connected to a power source 105 and produces an output voltage (SEC) at 140 to be sent to a rectifier. The secondary winding of transformer T1 (115 and 120) provides a sinusoidal output which is used to drive a depletion-mode JFET Q1 (125) on and off. A coupling capacitor 130 provides DC isolation from the secondary winding to the gate of 125 because the gate-source junction of Q1 125 clamps the positive peak voltage to a diode drop above ground. A high value resistor 135 connecting the gate of transistor 125 to ground provides a DC ground reference. The voltage on the secondary winding can then be rectified to produce a boosted DC output voltage. Typical waveforms observed in circuit 100 are shown in FIG. 1(b), in which waveform 150 represents the voltage observed at the drain terminal of transistor 125, waveform 160 represents the current flowing through the drain terminal of transistor 125, and waveform 170 represents the voltage 140 at SEC in FIG. 1(a).

For energy sources whose voltage polarity remains constant, the approach described in FIG. 1(a) works well. However, in some applications, the polarity of the input voltage may be unknown, or may change with time. For example, this situation will occur when a Peltier cell is used as the energy source. As commonly known, a Peltier cell generates a DC voltage based on the so-called "Seebeck effect" when a temperature differential is imposed across the cell. Due to the fact that the polarity of the output voltage of the Peltier cell depends on the "polarity" of the temperature differential across it, the polarity of the input voltage to the step-up converter powered by a Peltier dynamically changes. That is, in some applications, the "hot" and "cold" sides of the cell may switch depending on ambient conditions. In this case, a step-up converter using a Peltier cell needs to operate with either polarity input voltage. None of the existing techniques is capable of operating under such conditions.

The requirements to be "polarity independent" and the ability to operate from a very low input voltage of either polarity pose a major challenge to the prior art. All existing step-up converters, including the ones that can work with low input voltages, cannot start or operate if the wrong DC polarity is applied to their inputs.

SUMMARY

The present teaching relates to polarity independent step-up converter capable of operating under ultra-low input voltage conditions. In some exemplary embodiments, a step-up converter connecting to an input source having a variable polarity comprises a step-up transformer including a primary winding and two secondary windings coupled to the input source, a first depletion mode transistor coupled at one of its terminals to the input source and at another one of its terminals to a reference point, and a second depletion mode transistor coupled at its first terminal to the primary winding and at its second terminal to the reference point.

According to some aspects of the present teaching, each of the two secondary windings is capacitively coupled to first and second diode charge pump circuits, respectively. The outputs of the first and second diode charge pump circuits are then combined to generate an output of the step-up converter.

In some other embodiments, a step-up converter connecting to an input source having a variable polarity comprises a first core circuit and a second core circuit. The first core circuit is coupled to the input source and an output of the step-up converter and is configured to be active for a first input voltage polarity to output a first step-up voltage. The second core circuit is coupled to the input source and the output of the step-up converter and is configured to be active for a second input voltage polarity to output a second step-up voltage.

BRIEF DESCRIPTION OF THE DRAWINGS

The inventions claimed and/or described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

DETAILED DESCRIPTION

Figure 2A:
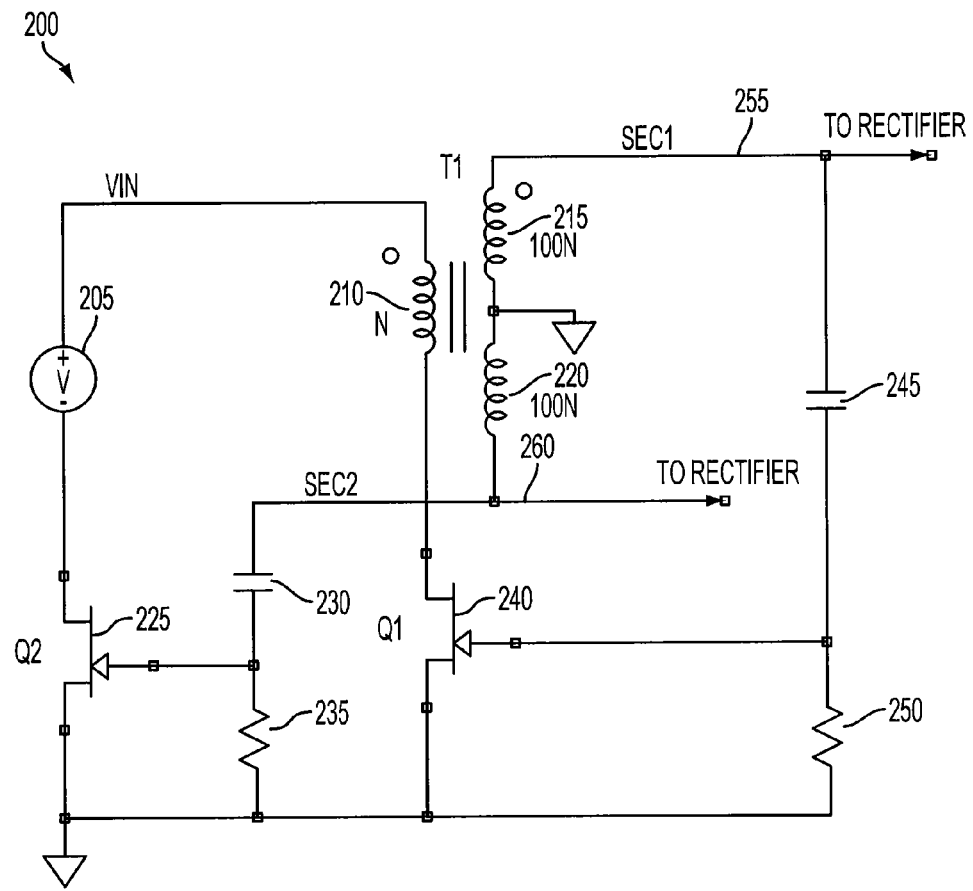
FIG. 2(a) depicts an exemplary circuit for a polarity independent and ultra low input voltage step-up converter, according to an embodiment of the present teaching.

Circuits for polarity independent step-up converter capable of operating under ultra-low input voltage conditions are disclosed. The present teaching is to solve the problem existing in the prior art technologies. In FIG. 2(a), an exemplary circuit 200 is shown according to an embodiment of the present teaching. Circuit 200 comprises an input voltage source 205, a transformer T1 including one first winding 210 and two secondary windings 215 and 220, two depletion mode devices 225 and 240, and additional components such as resistors 235 and 250 and capacitors 230 and 245.

The circuit 200 is designed to operate with either polarity input voltage. The input voltage source 205 provides an input voltage that can be of either polarity. In some embodiments, each of the two secondary windings of transformer T1, 215 and 220, has a similar turns ratio, e.g., 1:100 from primary to secondary. A grounded center-tap between the windings provides secondary voltages of equal amplitude but opposite phase. Although 1:100 is used herein as an example, it is understood that the primary to secondary turns ratio can be adjusted to a value based on the input voltage required in the application.

Figure 1A:
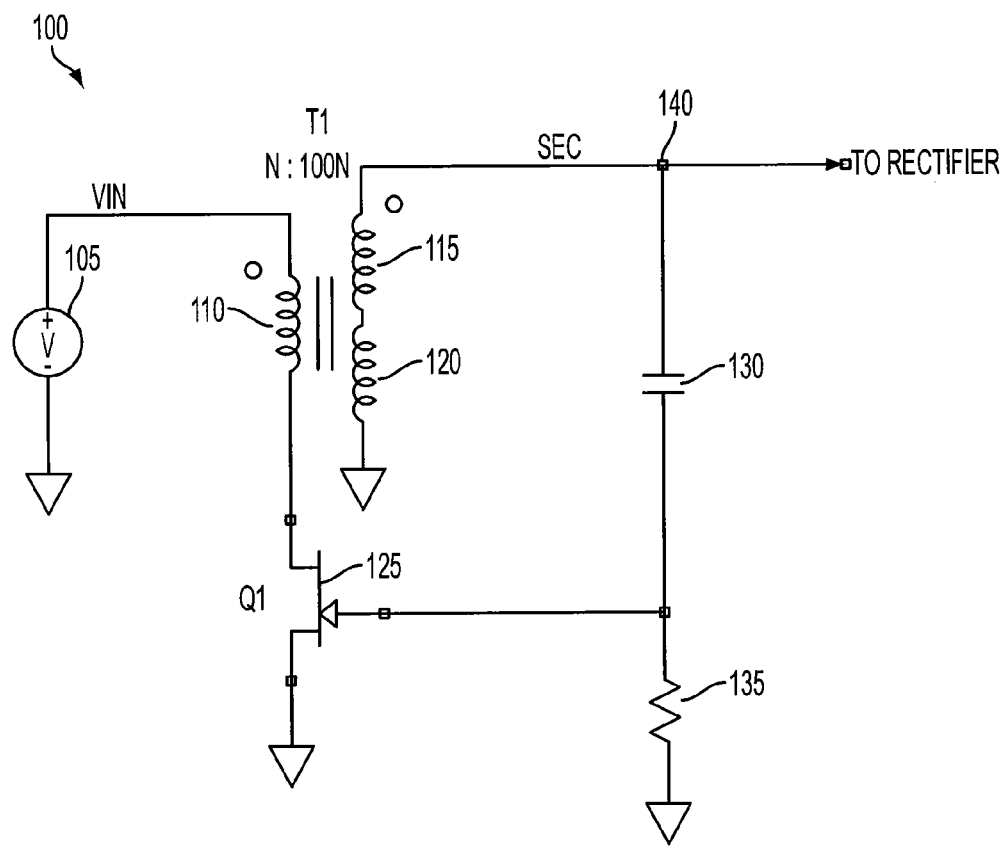
FIG. 1(a) (Prior Art) shows a simplified prior art step-up converter.
Figure 1B:
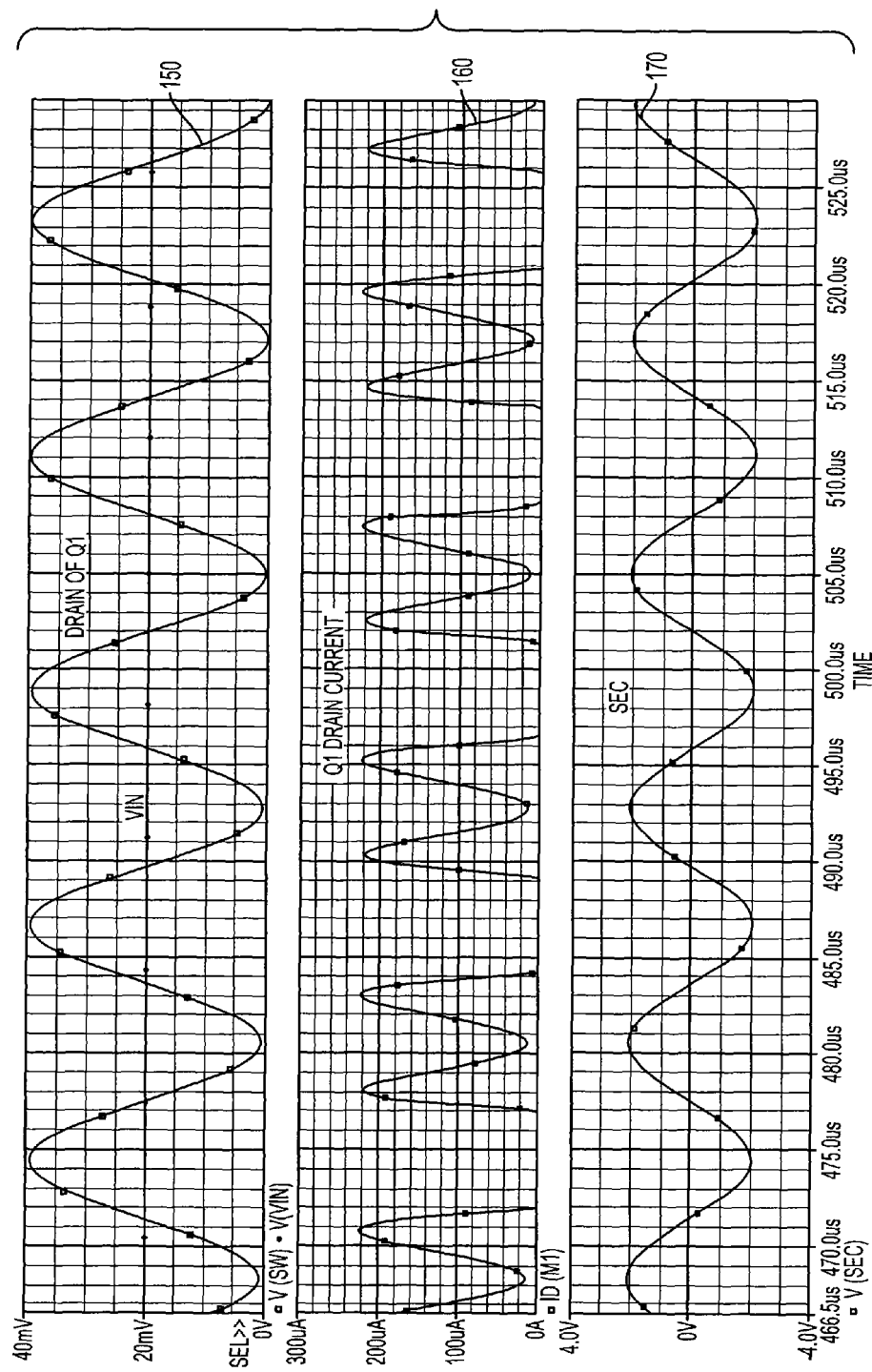
FIG. 1(b) shows waveforms observed at different points of the circuit as depicted in FIG. 1(a)

As seen in FIG. 2(a), two depletion-mode devices (Q1 240 and Q2 225) are employed in series, between the input source and the primary winding of transformer T1. Note that the input voltage source, as compared to FIG. 1(a), is no longer ground referenced. The gate of depletion mode device 225 is coupled to the secondary winding 220 via capacitor 230, which is serially connected to resistor 235 to the ground. At the other terminal of capacitor 230, where it connects to the secondary winding 220, an output voltage SEC2 260 is provided to a rectifier. The gate of depletion mode device 240 is coupled to secondary winding 215 via capacitor 245, which is serially connected to resistor 250 to the ground. At the other terminal of capacitor 245, where it connects to the secondary winding 215, an output voltage SEC1 255 is provided to the rectifier.

The depletion-mode devices 225 and 240 are driven by the opposite phases of T1's center-tapped secondary winding. When the input voltage is first applied, both Q1 240 and Q2 225 conduct because their gates are both at zero volts. The circuit 200 begins to oscillate because the negative gate threshold voltage of each transistor allows for an overlap in the conduction times of Q1 240 and Q2 225. As the secondary voltages increase in amplitude during each cycle, one transistor is turned on harder as the other transistor is turned off. During the overlap conduction time, current flows from the input source through Q1 240 and Q2 225 and the primary winding of T1. Note that since the circuit is fully symmetrical, the input voltage can be of either polarity and the circuit 200 will operate in the same manner, making it polarity independent. In some embodiments, the depletion mode JFETs (Q1 240 and Q2 225) can also be implemented using depletion mode NMOS devices.

Figure 2B:
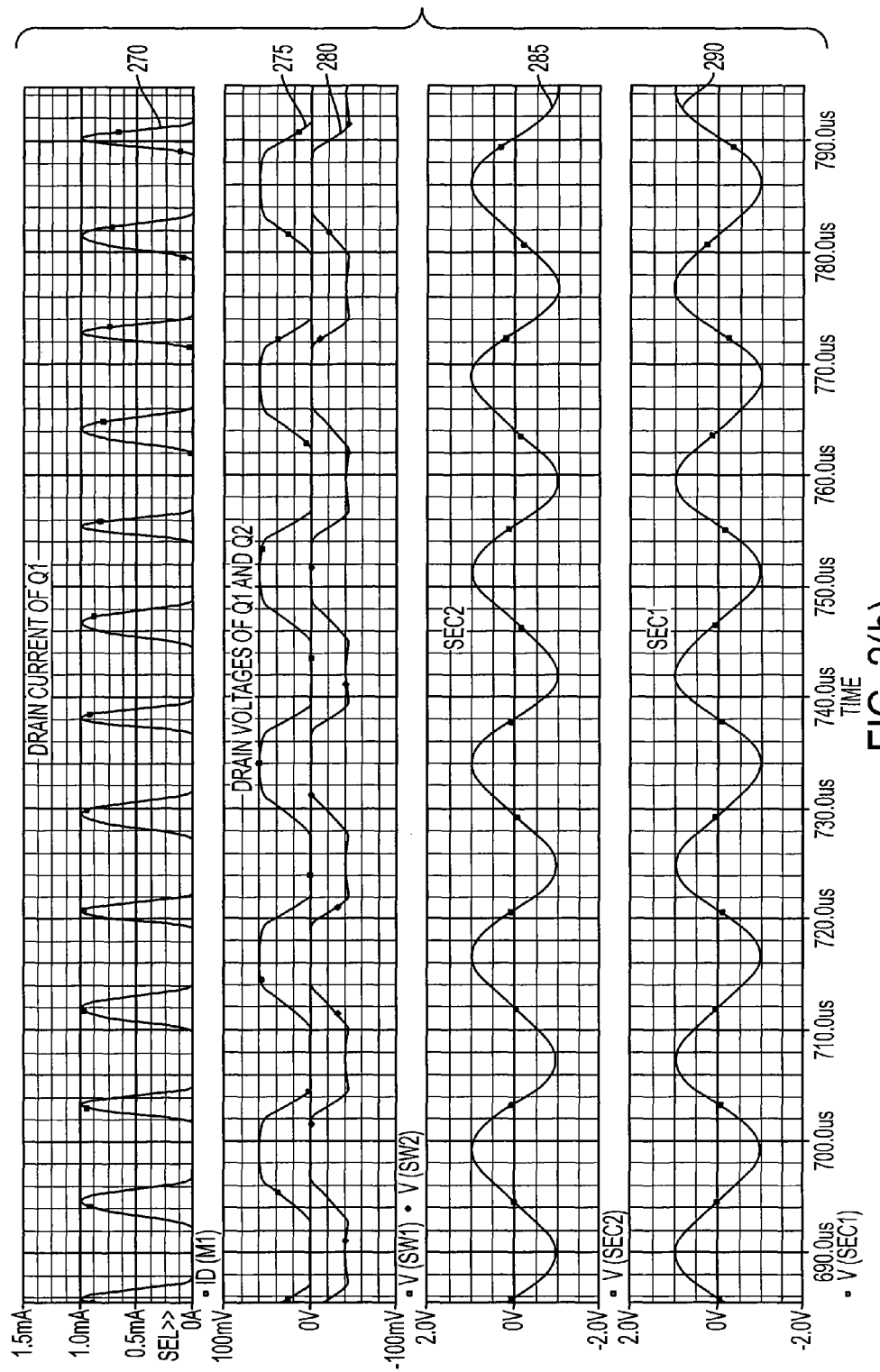
FIG. 2(b) shows waveforms observed at different points of the circuit as depicted in FIG. 2(a), according to an embodiment of the present teaching.

FIG. 2(b) shows different signals observed at different points of the circuit 200. For example, when input voltage is applied, the current observed at the drain terminal of transistor Q1 240 (waveform 270) is between zero and 1.0 mA corresponding to a certain portion of the input phase. Waveforms 275 and 280 correspond to the voltages observed at the drain terminals of the two transistors, respectively. Waveform 285 corresponds to the output voltage observed at SEC2 260 and waveform 290 corresponds to the output voltage observed at SEC1 255.

Figure 2C:
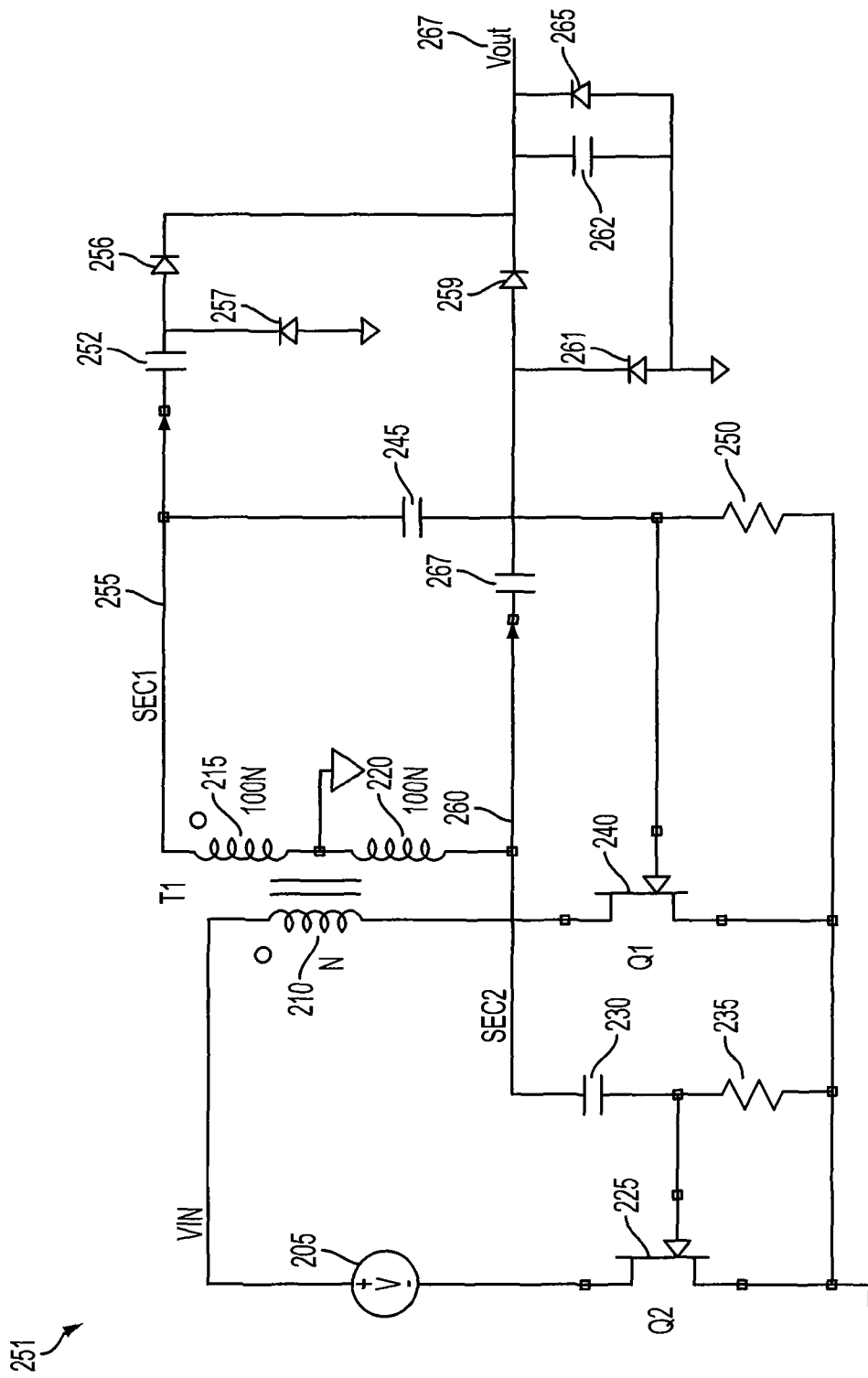
FIG. 2(c) shows a different exemplary circuit for a polarity independent and ultra low input voltage step-up converter, according to an embodiment of the present teaching.

The circuit as illustrated in FIG. 2(a) may also be capacitively coupled to diode charge pump circuits. One such embodiment is illustrated in FIG. 2(c). Specifically, circuit 251 is similarly constructed as circuit 200 except that SEC1 255 is capacitively coupled to, via capacitor 252, a diode charge pump comprising diodes 256 and 257 and SEC2 260 is capacitively coupled to, via capacitor 267, another charge diode charge pump comprising diodes 259 and 261. The outputs of the respective diode charge pump circuits are combined at node Vout 267. In this illustrated embodiment, Vout is decoupled with a 1 uF filter capacitor 262 and limited to approximately 5V by a Zener diode 265.

Figure 3:
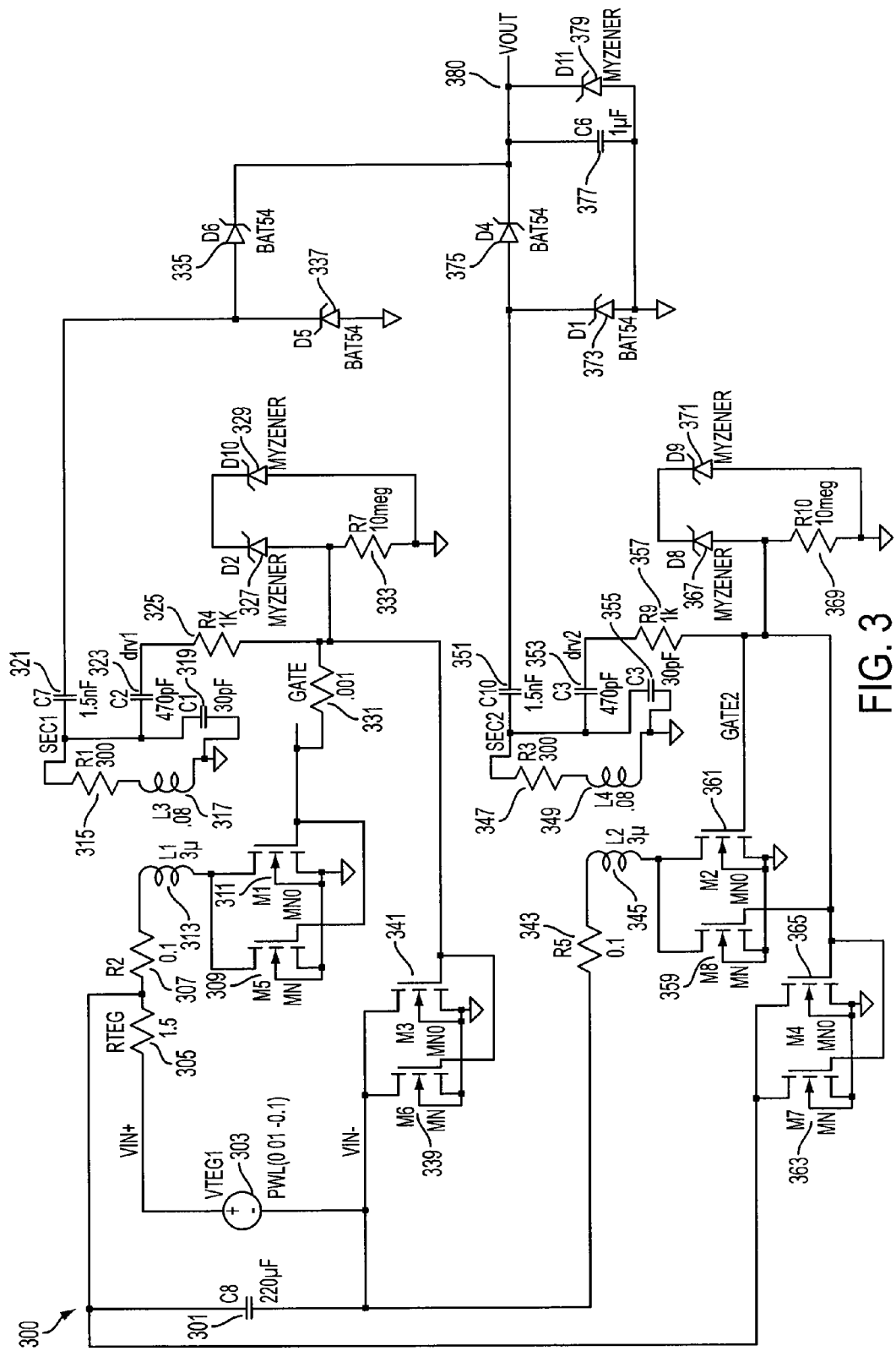
FIG. 3 depicts another exemplary circuit for a polarity independent and ultra low input voltage step-up converter, according to an embodiment of the present teaching.

Another exemplary circuit 300 is shown in FIG. 3. In this exemplary embodiment, there are two transformers employed with similar turns ratios, e.g., 1:100, illustrated by L1 and L3 (313 and 317) and L2 and L4 (345 and 349), respectively. Coupled with each of the transformers are two sets of MOSFET transistors connected in parallel. As illustrated in FIG. 3, the first set of MOSFET transistors M1 311 and M5 309 as well as the second set of MOSFET transistors M3 341 and M6 339 are coupled with the transformer including the primary winding L1 313 and secondary winding L3 317 via the transformer coupling coefficient and capacitor C2 323, which is a gate drive coupling capacitor. The transformer coupling coefficient is typically between 0.95 and 0.99. A coupling coefficient of 1.0 represents an ideal transformer. This forms the core of the Ultra-Low voltage converter when the input voltage supplied by VTEG1 303 is a positive polarity.

Similarly, another two sets of MOSFET transistors are coupled to a transformer modeled by the primary winding L2 345 and secondary winding L4 349. Specifically, the first set of MOSFET transistors M2 361 and M8 359 as well as the second set of MOSFET transistors M4 365 and M7 363 are coupled with L2/L4 transformer with a certain coupling coefficient and C9 353 which is another gate drive coupling capacitor. This forms the core of the Ultra-Low voltage converter when the input voltage supplied by Thermo Electric Generator 1 (or VTEG1) 303 is a negative polarity.

Both core ultra-low voltage circuits are capacitively coupled to their corresponding diode charge pump circuits, respectively. Specifically, the top ultra-low voltage circuit for the positive polarity converter is capacitively coupled to a charge pump comprising diodes D5 337 and D6 335. The bottom ultra-voltage circuit for the negative polarity converter is capacitively coupled to its charge pump comprising diodes D1 373 and D4 375. The outputs of the respective diode charge pump circuits are combined at the node VOUT 380. In the illustrated embodiment, VOUT is decoupled with a 1 uF filter capacitor 377 and limited to approximately 5V by a Zener diode, D11 379.

The Thermo Electric Generator (VTEG1) and its associated series resistance represented by (RTEG) 305 form an electrical model of the Thermal Electric Generator power source suitable for computer simulation. There are other components in circuit 300 and their functionalities are the following. Resistors R1/R2 (315/307) and R3/R5 (347/343) correspond to the parasitic winding resistances of the respective transformers. Capacitor C8 301 is an input decoupling capacitor connected across the Thermal Electric Generator (TEG) voltage source to minimize the effects of voltage ripple in the input. Capacitors C1 319 and C3 355 model the parasitic interwinding capacitances of the respective transformers. Diodes D2/D10 (327/329) and D3/D9 (367/371) are Zener diode clamps to prevent an over voltage of the gate-sources of the MOSFET power switches.

Although resistor 331 is shown in the illustrative embodiment, it was added for simulation purposes. In practice, resistor 331 does not need to be present. Resistors 333 and 369 provide a DC termination to ground for the respective MOSFET power transistors. Resistors 325 and 357 provide current limiting for the Zener diode clamps (D3 367, D9 371, D2 327, D10 329), although they may not be critical to the normal operation of the circuit.

Given an input voltage polarity, only one of the core circuits is active. The circuit 300 as shown in FIG. 3, begins to deliver power to the load at an input voltage of approximately +/−21 mV. If larger geometry transistors are employed (MN1, 2,3,4), the typical startup voltage can be lower. Below, a detailed description of the circuit operation is provided. Since circuit operation is identical for each of the positive and negative core circuits, the discussion herein focuses on the negative polarity converter (bottom half of circuit 300 in FIG. 3). Operation of the positive polarity core is identical, when a positive voltage is applied.

Figure 4:
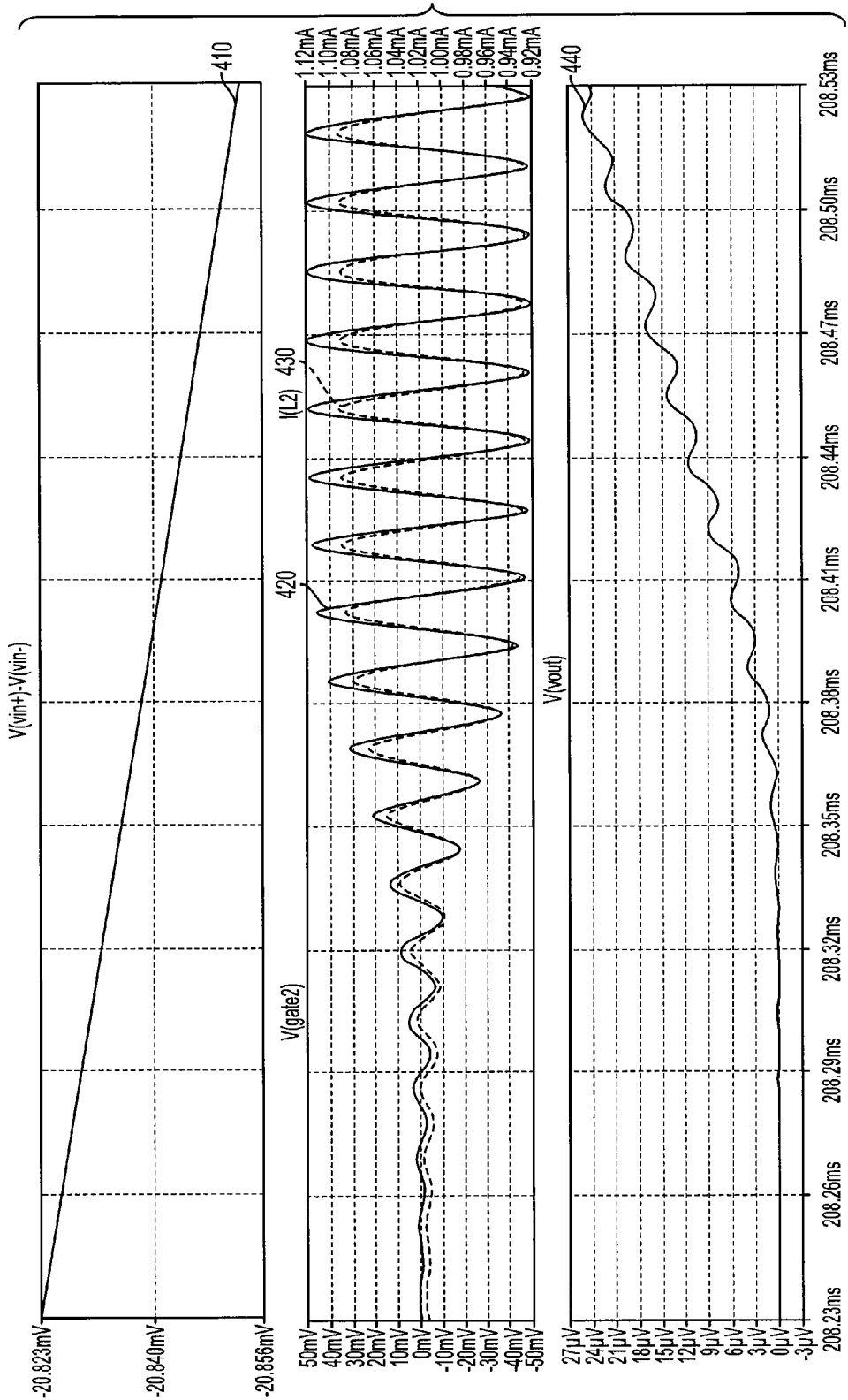
FIGS. 4-7 show different waveforms observed at different points of the circuit as depicted in FIG. 3, according to an embodiment of the present teaching.
Figure 5:
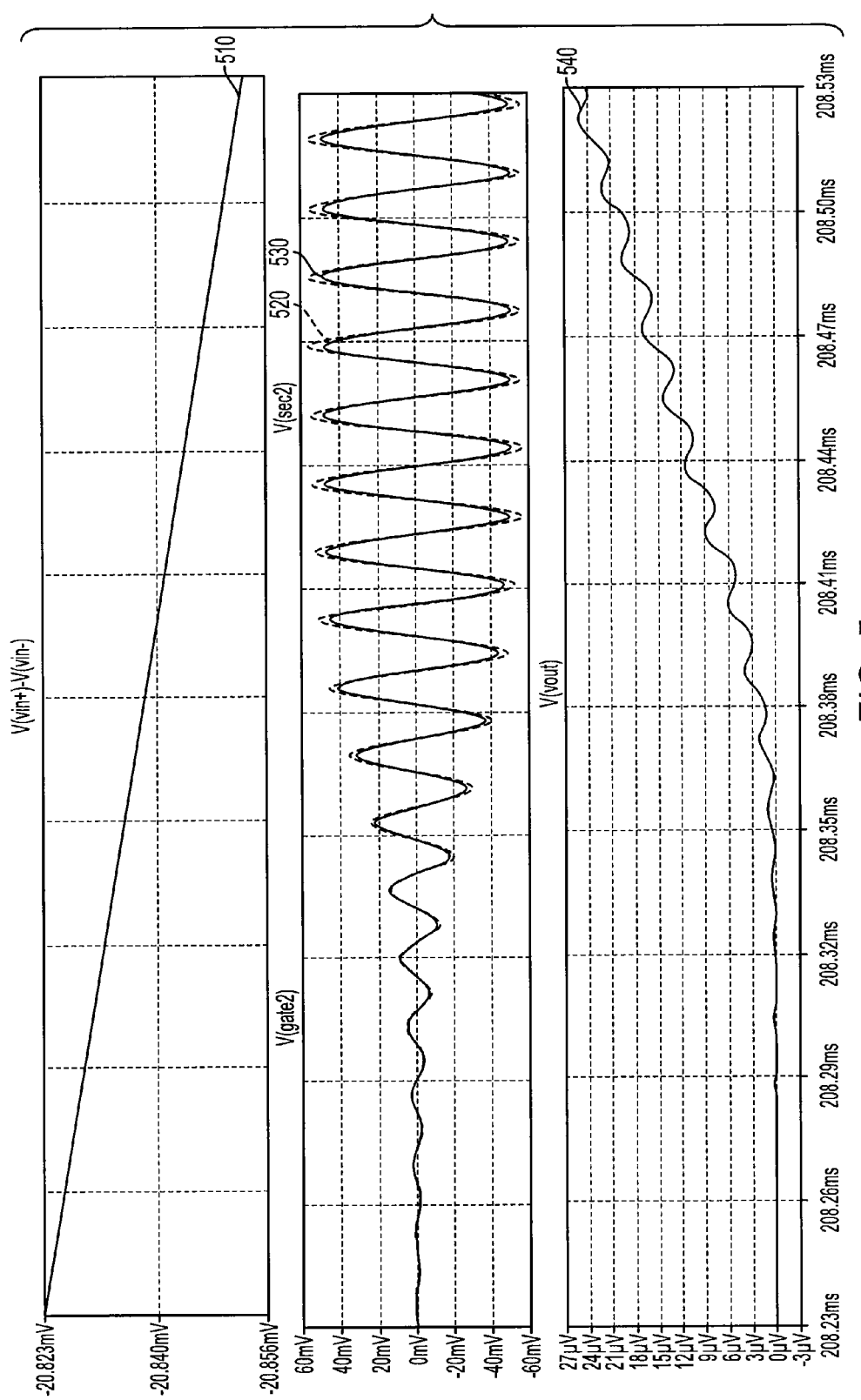
Figure 6:
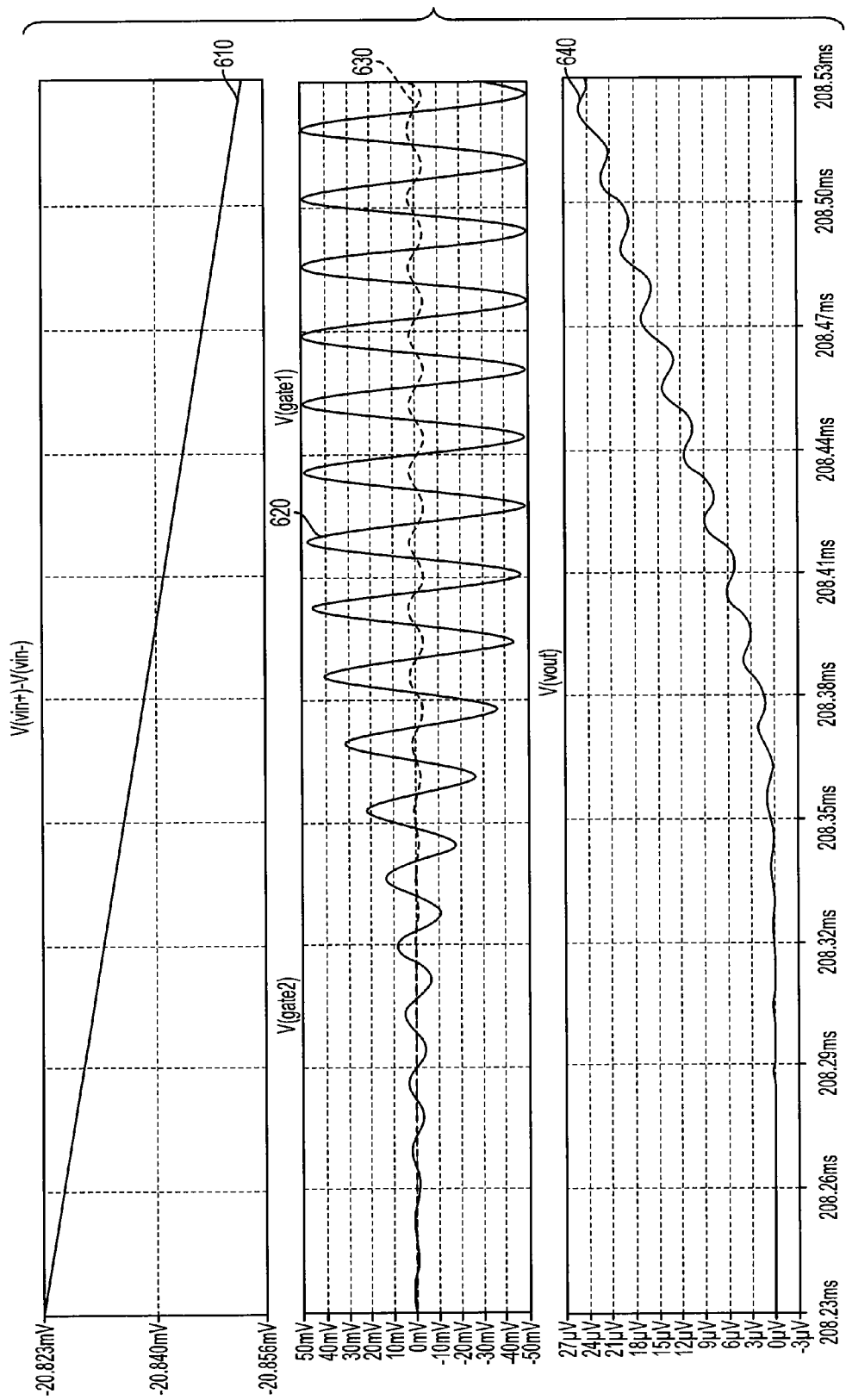
Figure 7:
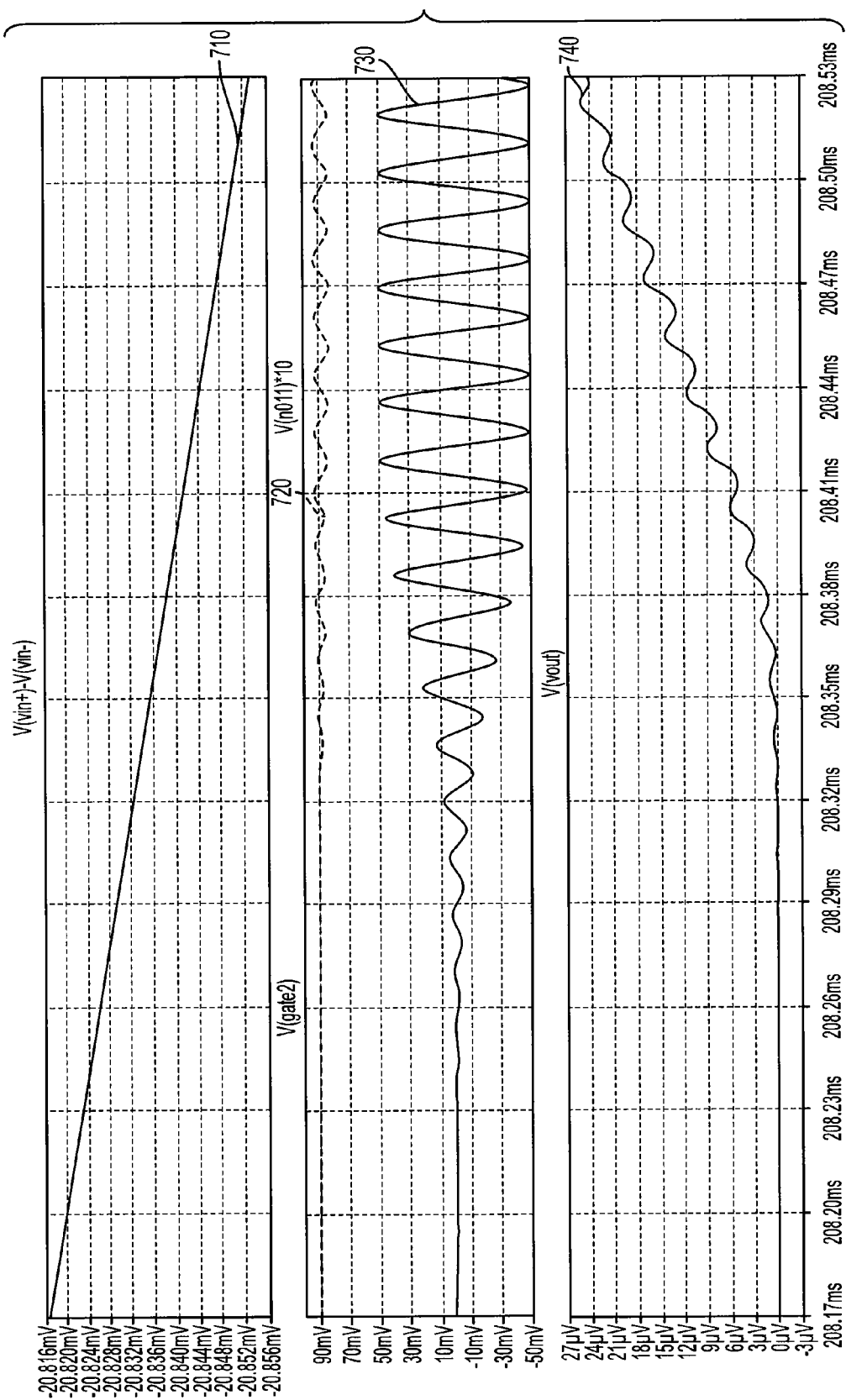

FIGS. 4 to 7 show the initial converter startup as the input voltage provided by VTEG1 slowly increases from 0V. Specifically, in FIG. 4, the top plot shows the input voltage provided at the VTEG 303. The middle plot depicts the voltage (see waveform 420) measured at the gate terminal of transistor M2 361 (GATE2) at the start point of the converter as well as the primary current (430) measured at L2 345. The bottom plot in FIG. 4 depicts the output voltage (440) measured at VOUT 380. FIG. 5 provides similar plots, where plot 510 corresponds to 410, plot 540 corresponds to 440, 530 corresponds to 420, with an exception that plot 520 corresponds to the voltage observed at the secondary winding at point SEC2 in FIG. 3. FIG. 6 also provides plots related to the initial startup process, where plot 610 corresponds to 410, and plot 640 corresponds to plot 440. In FIG. 6, voltages observed at GATE1 and GATE2, respectively, are plotted as 620 and 630 and it can be seen that when GATE2 in the bottom core circuit is active (see plot 620), GATE1 of the top core circuit is inactive (see plot 630). FIG. 7 provides another variation in depicting the initial startup process, in which plot 710 corresponds to plot 410 and plot 740 corresponds to plot 440, where the two plots in the middle represent the voltage observed at GATE2 (730) and the voltage observed at the drain terminal of transistor M2 361.

In FIG. 4, it can be seen that the negative polarity core circuit begins to self-oscillate at an input voltage of approximately 21 mV. During such an initial startup, only the depletion mode MOSFETs, M2 361 and M4 365 are conducting, due to the very low voltage across the gate to the source. This can be seen in the voltage waveform 420 plotted based on the observed voltage at the gate 2 terminal (see gates of MOSFETs M2 361 and M4 365 in FIG. 3). This is due to the depletion mode MOSFETs having a typical threshold voltage of approximately −0.5V, while the threshold voltage for standard MOSFETS is about 0.75V.

As can be seen in FIG. 3, with a sufficient voltage on VTEG1, MOSFET transistors M2 361 and M4 365 bridge the transformer primary, L2 345, across VTEG1 with M4 365 providing the return path for VTEG1 and M2 361 driving one side of the primary winding and VTEG1 driving the opposite side of the primary winding. A qualitative description of the oscillator is provided herein. The voltage on the gate terminal of M2 361 (GATE2) is phase shifted by 180 degrees at the drain of transistor M2 361 due to its common source amplifier configuration. This phase shifted voltage is applied across the primary of the transformer, L2 345, as described above. The transformer couples this signal to its secondary, L4 349. Because the secondary or magnetizing inductance of the transformer acts upon the effective secondary capacitance comprised of the MOSFET input capacitance and transformer winding capacitance, it imposes an additional 180 degree phase shift at the resonant frequency of the circuit. To sustain oscillation, both a positive feedback (360 degree phase shift) and a loop gain that is greater than unity are required. Both of these conditions are satisfied when the input voltage from VTEG1 is high enough to bring the depletion mode MOSFET M2 361 out of the linear region of operation, which is characterized by very low gain to its saturated region, characterized by high gain.

Once the circuit begins to oscillate, the coupling capacitor, C10 351 connected on one side to SEC2 and on its other side to diode charge pump D1 373 and D4 375 transfers current to VOUT 380 via D4 375 when the oscillation polarity is positive and recharges C10 351 via D1 373 when the oscillation voltage polarity is negative. The steady state voltage across C10 351 is approximately equal to ½ the p-p amplitude of the oscillating waveform seen on the transformer secondary, SEC2. The oscillation amplitude observed at SEC2 is a function of the voltage applied to the transformer primary, which is, e.g., in an ideal situation VTEG1 and the transformer turns ratio, 100:1 in the illustrated embodiment. It is understood that other transformer ratios can also be used.

In general, a lower turns ratio requires a higher startup voltage but will deliver greater power with a larger Vin applied, while the higher turns ratio will allow for lower startup voltages, but lower output power at higher input voltages. FIGS. 8-11 show waveforms observed at the gate terminal (GATE2) of transistor M2 361 and gate terminal (GATE1) of transistor M1 311 in circuit 300 when an instantaneous +/−100 mV input voltage is applied. Zener clamps D3/D9 (367/371) and D2/D10 (327/329) limit the voltages at those gate terminals (GATE1 and GATE2) to approximately +/−5V, which is required by the particular IC process employed. It is to be noted that when GATE2 is active, GATE1 is not active and when the voltage polarity is switched, the opposite occurs. As the gate drive increases, the converter pulls more current from the input voltage source, VTEG1 303.

Figure 8:
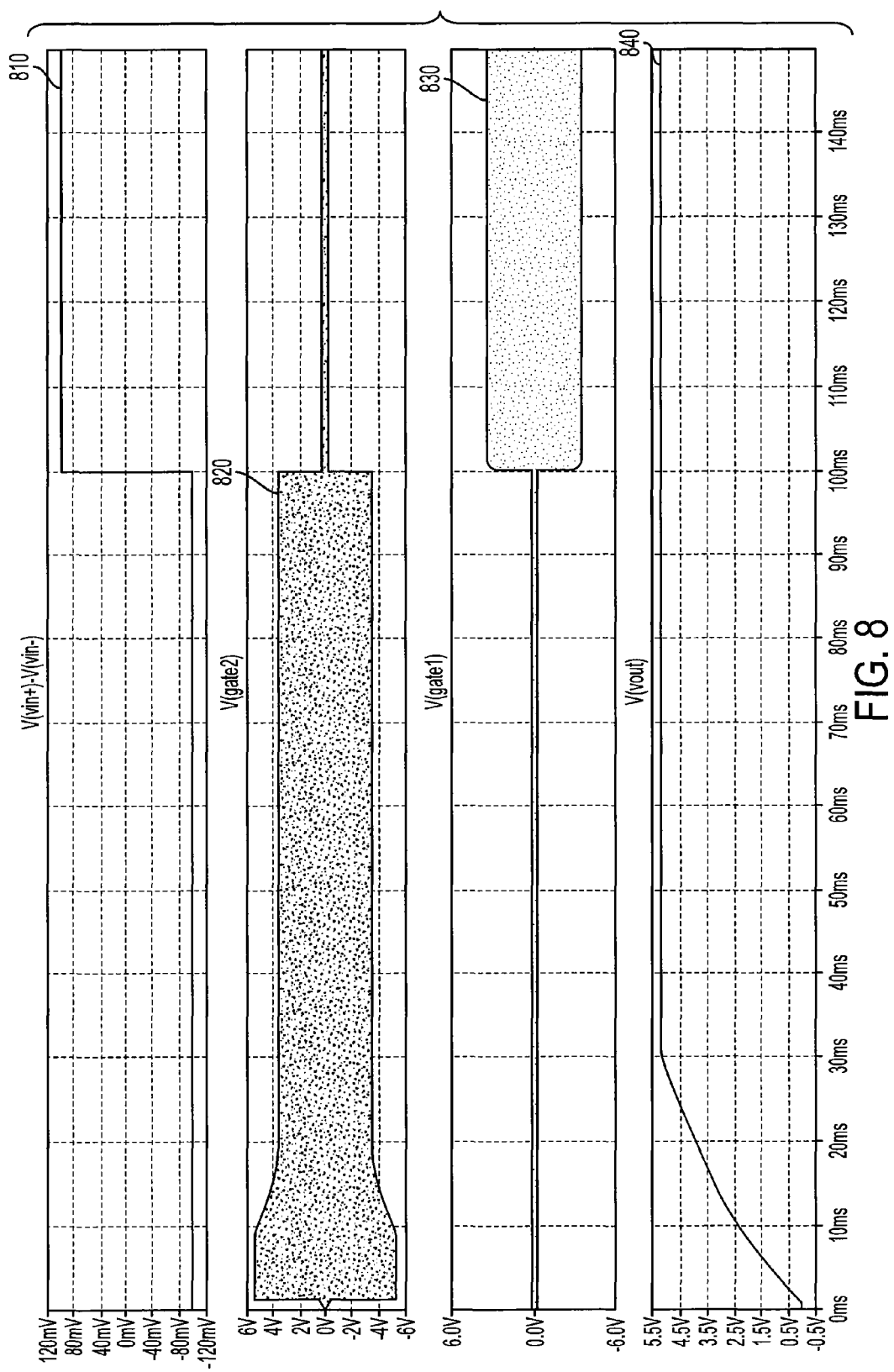
FIGS. 8-11 show different waveforms observed at different points of the circuit as depicted in FIG. 3, according to an embodiment of the present teaching.

This can be seen in FIG. 8, where when the VTEG switches from an input voltage of −100 mV to +100 mV (see plot 810), transistor M2 361 switches from active to inactive (see plot 820) and transistor M1 311 switches from inactive to active (see plot 830). The voltage measured at GATE2 is limited by the Zener diode clamp to about +/−5V (820) and so is the voltage measured at GATE1 (830). The VOUT measured at 380 remains at its regulated value of 5V, regardless of the input voltage polarity applied to the converter. (see plot 840).

Figure 9:
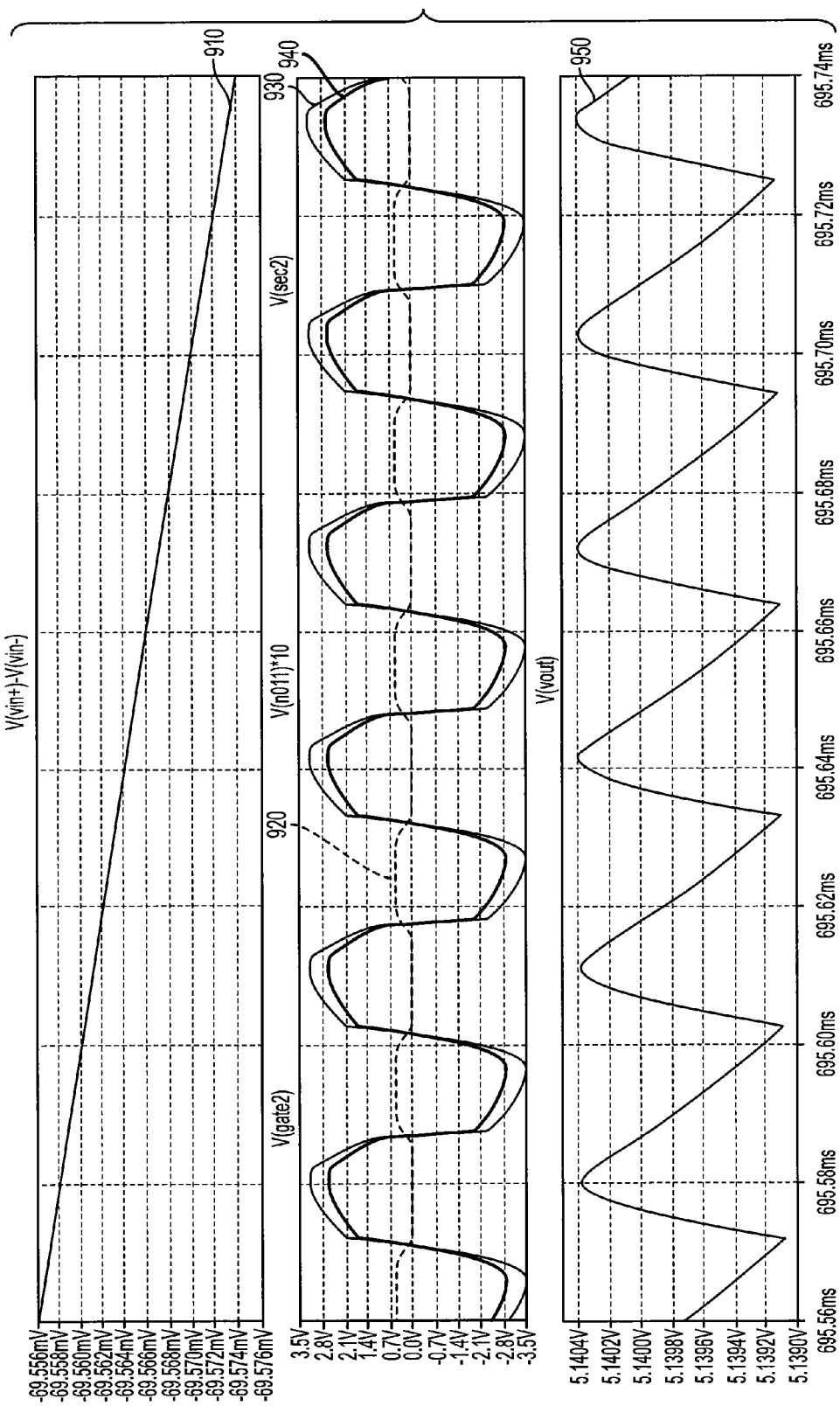

FIG. 9 shows the input and output voltage relationship as well as voltages observed at different points within circuit 300. Waveform 910 represents the input voltage with a certain polarity. Waveform 950 represents the output voltage VOUT 380. As can be seen, the output voltage exhibits a small 1.4 mV peak to peak ripple riding on the nominal 5V DC at the oscillation frequency of the converter. Waveform 920 represents the primary voltage of transformer L2, waveform 930 represents the secondary voltage observed at SEC2, and waveform 940 represents the gate drive voltage observed at GATE2.

Figure 10:
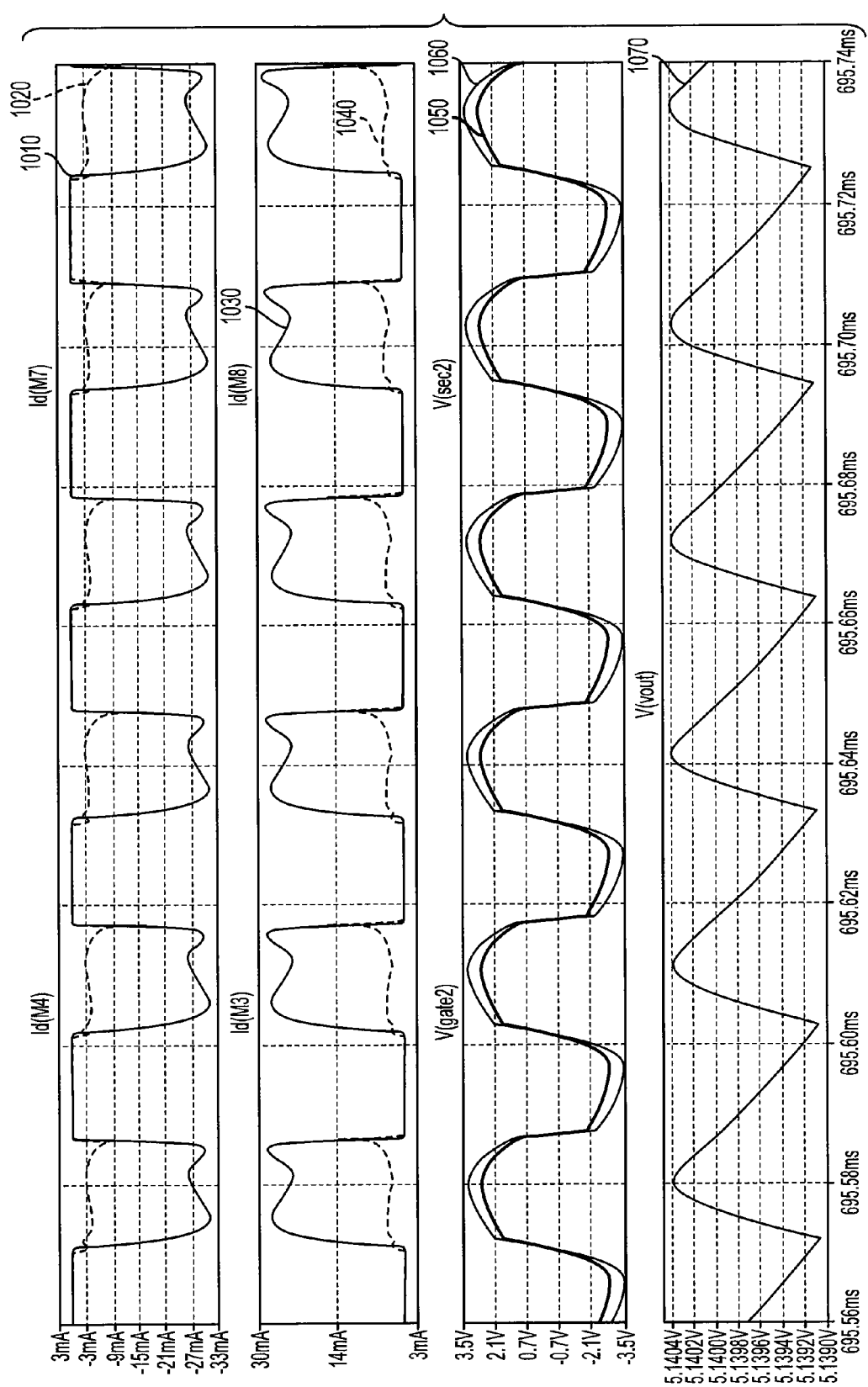

FIG. 10 similarly shows the output voltage waveform 1070 as well as the voltage waveforms 1050 and 1060 based on voltages observed at GATE2 and SEC2, respectively. Waveform 1020 represents the current observed at the drain terminal of depletion mode device M4 365 displayed in comparison with the magnitude of the drain current in the standard threshold MOSFET t 1010 of transistor M7 363, once the circuit 300 is in regulation with a sufficient gate drive. Similarly, Waveform 1040 represents the current observed at the drain terminal of the parallelly connected depletion mode device M2 361 displayed in comparison with the magnitude of drain current in the standard MOSFET threshold 1030 of transistor M8 359 when the circuit 300 is in regulation with a sufficient gate drive.

Figure 11:
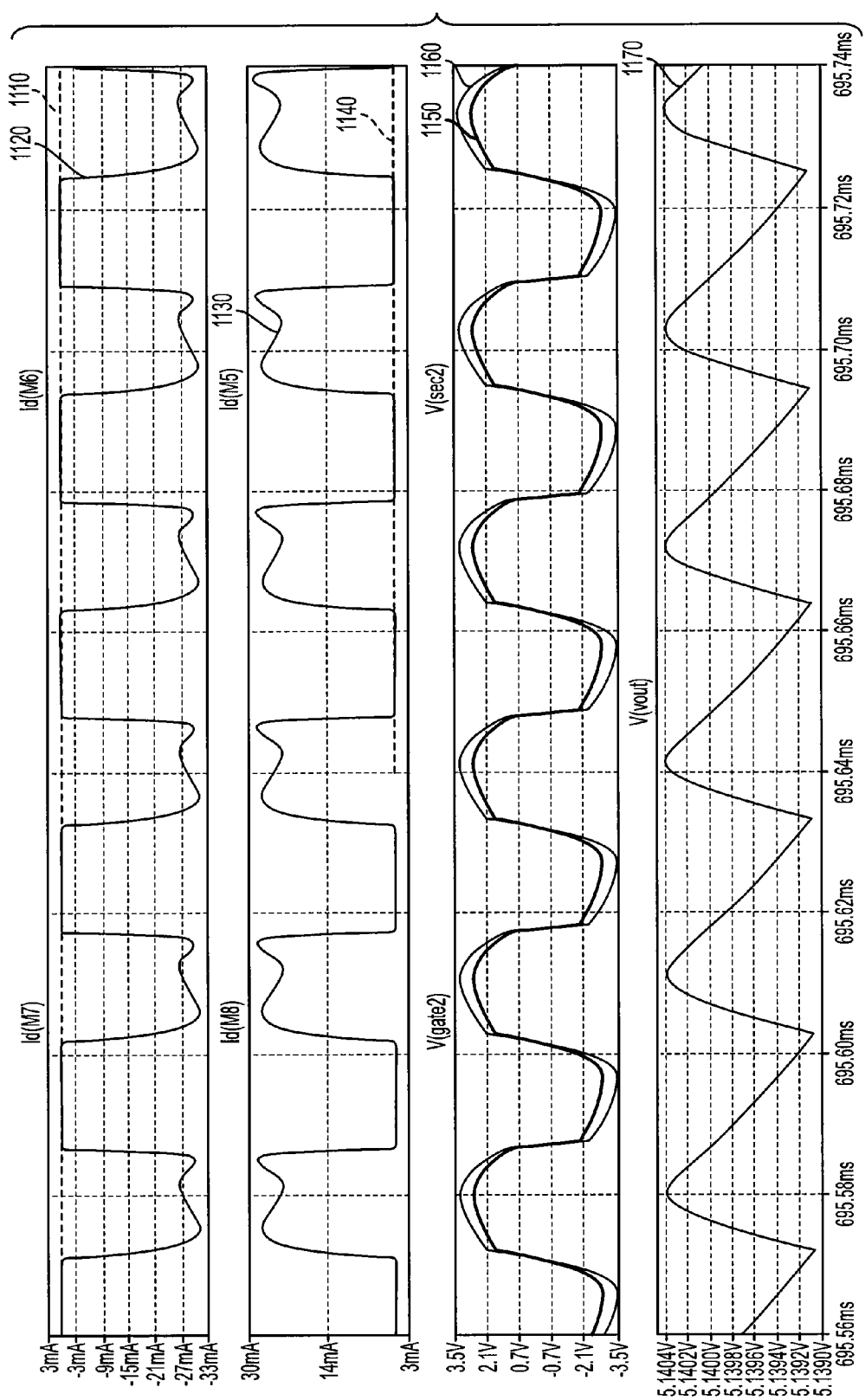

In FIG. 11, in addition to the similar plots (output voltage 1170 and voltage waveforms 1150 and 1160 representing the voltages observed at GATE2 and SEC2) as those shown in FIGS. 9 and 10, the top two plots display the relative magnitude of the standard threshold MOSFETs for both halves of the converter when the output voltage is in regulation. Note how the drain currents of M8 359 and M6 339 (the non-active) side in this simulation are essentially zero.

In the illustrated embodiment, VTEG1 is modeled with a 1.5 ohm source resistance, as a result, the actual voltage applied across the primary is reduced and the resulting gate drive voltage is reduced proportionally to about +/−3.5 V seen after the circuit has been in operation by ~20 mS. With non-zero source impedance devices, such as Thermal Electric Generators (TEG), it may be desirable to match the input resistance of the power converter to the source resistance of the TEG in order to extract the maximum available power. The natural negative feedback characteristic as shown here, although not perfect, tends to keep the power converter operating near the optimum point for maximum power transfer.

While the inventions have been described with reference to the certain illustrated embodiments, the words that have been used herein are words of description, rather than words of limitation. Changes may be made, within the purview of the appended claims, without departing from the scope and spirit of the invention in its aspects. Although the inventions have been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the appended claims.

We claim:

1. A voltage step-up converter comprising:
   an input source having a variable polarity;
   a single step-up transformer including a primary winding and two secondary windings, wherein the primary winding is coupled to the input source;
   a first depletion mode transistor coupled at its first terminal to the input source and at its second terminal to a reference point; and
   a second depletion mode transistor coupled at its first terminal to the primary winding and at its second terminal to the reference point;
   a coupling capacitor between the first depletion mode transistor and a second winding of the secondary winding; and
   a second coupling capacitor between the second depletion mode transistor and a first winding of the secondary winding,
   wherein the step-up converter is polarity independent.

2. The step-up converter of claim 1, wherein the input source includes Peltier cells.

3. The step-up converter of claim 1, wherein the two secondary windings of the single step-up transformer have a certain turns ratio from primary to secondary.

4. The step-up converter of claim 1, wherein the first depletion mode transistor and the second depletion mode transistor include N-channel JFET.

5. The step-up converter of claim 1, wherein the first depletion mode transistor and the second depletion mode transistor are each configured to conduct current with no bias voltage applied to their gate terminals.

6. The step-up converter of claim 1, wherein the gate terminal of the first depletion mode transistor is coupled to one terminal of the two secondary windings and the gate terminal of the second depletion mode transistor is coupled to an opposite terminal of the two secondary windings.

7. The step-up converter of claim 1, wherein the output of the step-up converter is coupled to a rectifier circuit.

8. The step-up converter of claim 6, wherein each one terminal of the two secondary windings is capacitively coupled to first and second diode charge pump circuits, respectively.

9. The step-up converter of claim 8, wherein the outputs of the first and second diode charge pump circuits are combined to generate an output of the step-up converter.

10. The step-up converter of claim 8, wherein the first charge pump circuit comprises:
    serially connected first and second diodes wherein
    anode of the first diode is connected to the ground and cathode of the first diode is connected with anode of the second diode,
    cathode of the second diode is connected to the output of the step-up converter, and
    one terminal of the first secondary winding is capacitively connected to the cathode of the first and anode of the second diode.

11. The step-up converter of claim 8, wherein the second charge pump circuit comprises:
    serially connected third and fourth diodes wherein
    anode of the third diode is connected to the ground and cathode of the third diode is connected to anode of the fourth diode,
    cathode of the fourth diode is connected to the output of the step-up converter, and
    one terminal of the second secondary winding is capacitively connected to the cathode of the third and anode of the fourth diode.

12. The step-up converter of claim 10 or 11, wherein the diodes in the first and second charge pump circuits are replaced with low loss MOSFET switches to improve overall conversion efficiency.

13. A polarity independent, ultra-low input voltage step-up converter comprising:
an input source having a variable polarity;
a first core circuit coupled to the input source and an output of the step-up converter, configured to be active for a first input voltage polarity to output a first step-up voltage;
a second core circuit coupled to the input source and the output of the step-up converter, configured to be active for a second input voltage polarity to output a second step-up voltage; and
charge pump circuitry configured to maintain the first core circuit inactive when the second core circuit is active, and to maintain the second core circuit inactive when the first core circuit is active;
wherein the first core circuit comprises:
a first step-up transformer including a first primary winding and a first secondary winding coupled to the input source;
a first depletion mode transistor coupled at its first terminal to the input source and at its second terminal to a reference point; and
a second depletion mode transistor coupled at its first terminal to the primary winding and at its second terminal to the reference point.

14. The step-up converter of claim 13, wherein the input source includes Peltier cells.

15. The step-up converter of claim 13, wherein the first secondary winding has a certain turns ratio from primary to secondary.

16. The step-up converter of claim 13, wherein the gate terminals of the first and second depletion mode transistors are coupled to the first secondary winding.

17. The step-up converter of claim 13, further comprising:
a first transistor connected in parallel with the first depletion mode transistor; and
a second transistor connected in parallel with the second depletion mode transistor, wherein
the first and second transistors are configured to enhance power delivery capability of the first core circuit.

18. The step-up converter of claim 17, wherein the first and second transistors are N-channel MOSFETs.

19. The step-up converter of claim 18, wherein the N-channel MOSFETs have a positive threshold voltage.

20. The step-up converter of claim 13, wherein the second core circuit comprises:
a second step-up transformer including a second primary winding and a second secondary winding coupled to the input source;
a third depletion mode transistor coupled at its first terminal to the input source and at its second terminal to a reference point; and
a fourth depletion mode transistor coupled at its first terminal to the primary winding and at its second terminal to the reference point.

21. The step-up converter of claim 20, wherein the second secondary winding has a certain turns ratio from primary to secondary.

22. The step-up converter of claim 20, wherein the gate terminals of the third and fourth depletion mode transistors are coupled to the second secondary winding.

23. The step-up converter of claim 20, further comprising:
a third transistor connected in parallel with the third depletion mode transistor; and
a fourth transistor connected in parallel with the fourth depletion mode transistor, wherein
the third and fourth transistors are configured to enhance power delivery capability of the second core circuit.

24. The step-up converter of claim 20, wherein the third and fourth transistors are N-channel MOSFETs.

25. The step-up converter of claim 24, wherein the N-channel MOSFETs have a positive threshold.

26. The step-up converter of claim 13 or claim 20, wherein the depletion mode transistors include N-channel JFETs.

27. The step-up converter of claim 13 or claim 20, wherein the depletion mode transistors are each configured to conduct current with no bias voltage applied to their gate terminals.

28. The step-up converter of claim 13, wherein the charge pump circuitry comprises:
the output of the first core circuit being capacitively coupled to a first diode charge pump circuit; and
the output of the second core circuit being capacitively coupled to a second diode charge pump circuit.

29. The step-up converter of claim 28, wherein the outputs of the first and second diode charge pump are combined to generate an output of the step-up converter.

30. The step-up converter of claim 28, wherein the first charge pump circuit comprises:
serially connected first and second diodes wherein
anode of the first diode is connected to the ground and cathode of the first diode is connected with anode of the second diode,
cathode of the second diode is connected to the output of the step-up converter, and
the output of the first core circuit is connected to the cathode of the first and anode of the second diodes.

31. The step-up converter of claim 28, wherein the second charge pump circuit comprises:
serially connected third and fourth diodes wherein
anode of the third diode is connected to the ground and cathode of the third diode is connected to anode of the fourth diode,
cathode of the fourth diode is connected to the output of the step-up converter, and
the output of the second core circuit is connected to the cathode of the third and anode of the fourth diodes.

32. The step-up converter of claim 30 or 31, wherein the diodes in the first and second charge pump circuits are replaced with low loss MOSFET switches to improve overall conversion efficiency.

* * * * *